United States Patent [19]
Friesen

[11] Patent Number: 5,673,545
[45] Date of Patent: Oct. 7, 1997

[54] SHREDDING ATTACHMENT FOR ROTARY CUTTER

[75] Inventor: Henry Friesen, Niagara Falls, Canada

[73] Assignee: Deere & Company, Moline, Ill.

[21] Appl. No.: 746,831

[22] Filed: Nov. 12, 1996

Related U.S. Application Data

[63] Continuation of Ser. No. 521,000, Aug. 30, 1995, abandoned.

[51] Int. Cl.$^6$ .................................................. A01D 34/63
[52] U.S. Cl. .................. 56/255; 56/295; 56/DIG. 17; 56/DIG. 20
[58] Field of Search .................. 56/17.5, 255, 295, 56/DIG. 17, DIG. 20

[56] References Cited

U.S. PATENT DOCUMENTS

| | | | |
|---|---|---|---|
| 2,547,540 | 4/1951 | Roberts | 56/255 |
| 2,697,322 | 12/1954 | Watrous | 56/295 |
| 3,343,350 | 9/1967 | Freelander et al. | 56/295 |
| 3,369,350 | 2/1968 | Rogers et al. | |
| 3,643,408 | 2/1972 | Kulak et al. | |
| 5,035,108 | 7/1991 | Meyer et al. | 56/17.5 |
| 5,274,987 | 1/1994 | Wiener | 56/255 |

OTHER PUBLICATIONS

Continental Belton Co., "Advertising Literature showing Models RSR-50 FA 60 and PS-72 72" Rotary Pull-Type Shredders offered for sale at least by Apr. 1967.

BMB Company, Inc., Advertising Literature shwoing Models BR-5-3 and BR-6-TSR Rotary Mowers offered for sale at least by Apr. 1971.

*Primary Examiner*—Randolph A. Reese
*Assistant Examiner*—Heather Shackelford

[57] ABSTRACT

A rotary cutter includes first and second pairs of blades pivotally mounted to opposite ends of a first blade holder, with the first pair of blades being spaced vertically above the second pair of blades. A third pair of blades for enhancing the shredding characteristic of the cutter are mounted to the opposite ends of a second blade holder having a longitudinal axis disposed perpendicular to a longitudinal axis of the first blade holder. The third pair of blades are located to operate at a height in between the respective heights of operation of the first and second blades and are located to trace a path which is radially inward from that traced by the first and second blades. The second blade holder is mounted to the first blade holder exclusive of the drive shaft to which the first blade holder is coupled and may be removed or assembled without disturbing the mounting of the first blade holder.

8 Claims, 2 Drawing Sheets

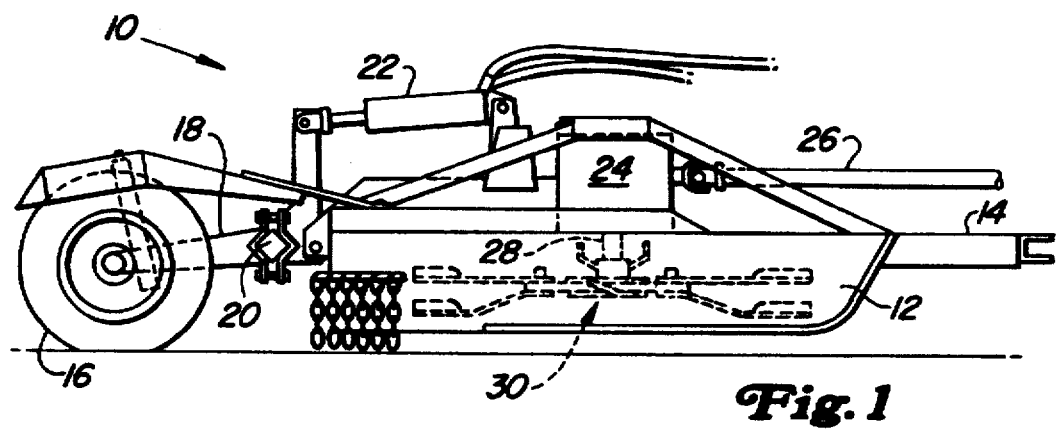
Fig. 1
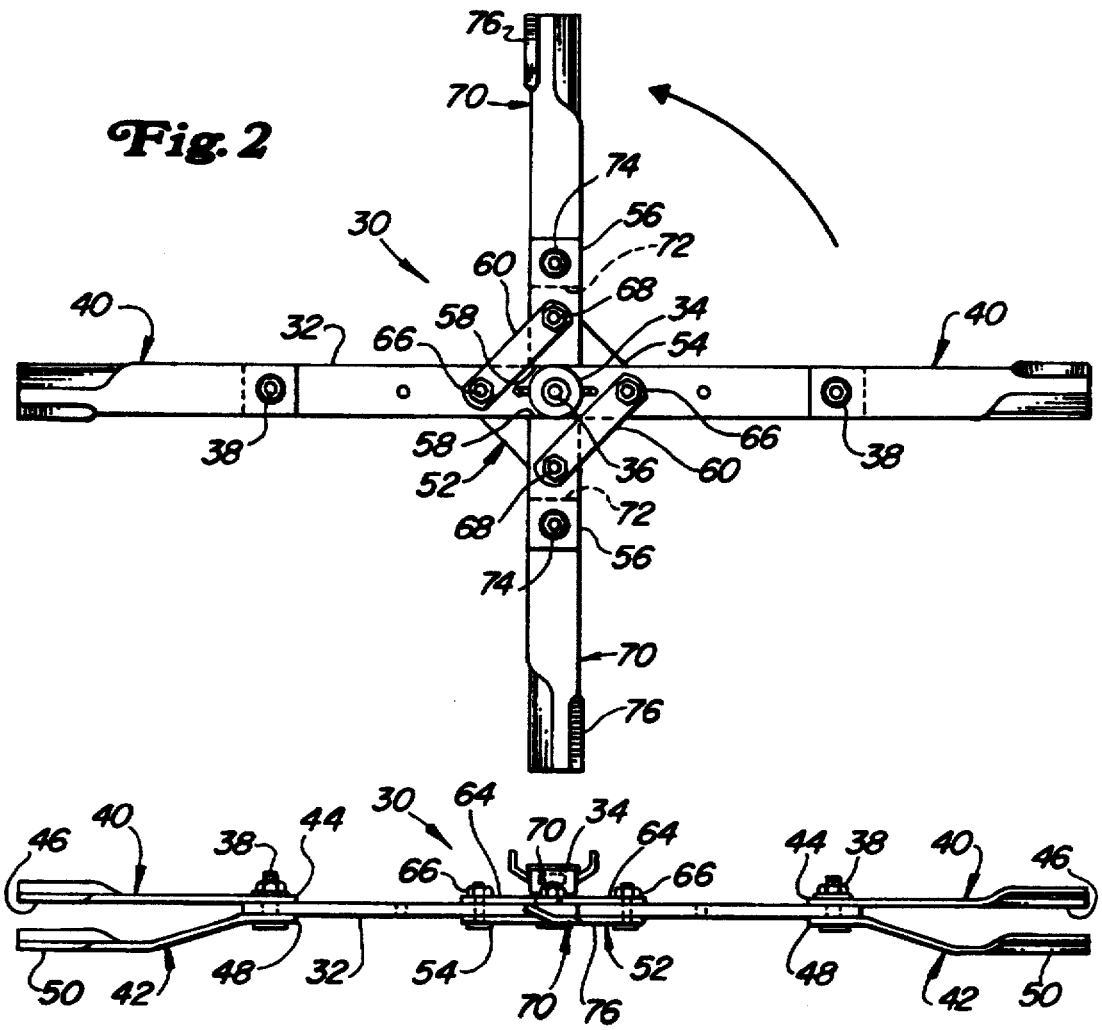
Fig. 2
Fig. 3

5,673,545

1

SHREDDING ATTACHMENT FOR ROTARY CUTTER

BACKGROUND OF THE INVENTION

This application is a continuation of application Ser. No. 08/521,000, filed Aug. 30, 1995, now abandoned.

The present invention relates to rotary cutters or mowers and more specifically relates to rotary cutters constructed for shredding mown material.

It is known to construct rotary cutters or mowers for heavy duty operation with mower blade assemblies including a pair of cutting blades pivotally mounted to opposite ends of a blade holder having a central location thereof secured to the lower end of a vertical drive shaft. In some installations, an optional second pair of cutting blades are mounted to opposite ends of the blade holder so as to operate in a plane above and to pivot coaxially with the first-mentioned pair of cutting blades (for example, see U.S. Pat. No. 3,643,408 granted to Kulak et al on 22, Feb. 1972). To enhance the shredding capability of this type of arrangement, it is known to mount a horizontal cutter bar to the side wall of the blade housing such that the first and second pairs of cutting blades respectively trace paths below and above the cutter bar (for example, see U.S. Pat. No. 3,369,350 granted to Rogers et al on 20 Feb. 1968).

Another cutter or mower design includes a blade holder in the form of a circular plate mounted to the mower drive shaft and having a first pair of cutter blades pivotally mounted at first diametrically opposite locations of the plate and a second pair of cutter blades pivotally mounted at second diametrically opposite locations offset 90° from the first diametrically opposite locations of the plate, with the cutting portions of the second pair of cutter blades being offset vertically to sweep a path below the path swept by the first pair of cutter blades. It is known to provide additional shredding capability in designs of this sort by mounting a plurality of stationary, vertical shredding knives or bars to the underside of the top of the mower housing or deck so as to be spaced above the path swept by the upper pair of cutting blades.

While the usage of fixed shredding bars, as described above, results in adequate shredding of material, them is always the possibility that an obstruction will deflect the rotating cutting blades such that they contact and damage the shredding bars and themselves.

BACKGROUND OF THE INVENTION

According to the present invention, there is provided a rotary cutter having an improved attachment for effecting enhanced shredding.

An object of the invention is to provide a rotary cutter having an attachment for effecting enhanced shredding while operating in a manner which does not increase the possibility of damage to the cutter.

A more specific object of the invention is to provide a rotary cutter including first and second pairs of cutting blades mounted one above the other with first blades of each pair being mounted to one end of a first blade holder for pivoting about a first axis and with second blades of each pair being mounted to another end of the blade holder for pivoting about a second axis, and a third pair of blades being pivotally mounted to opposite ends of a second blade holder offset 90° from the first blade holder and having a plane of operation located between those of the first and second pairs of blades.

2

Another object of the invention is to provide a rotary cutter having three pairs of blades with at least two of the pairs of blades being identical.

Yet another object of the invention is to provide a rotary cutter having two blade holders with the first blade holder being mounted to the mower drive shaft and with the second blade holder being disposed at 90° to and being designed for connection to the first blade holder such that it may be installed or removed as a complete assembly without having to disturb the mounting of the first blade holder.

Still another object of the invention is to provide a rotary cutter having a third pair of blades as set forth in one or more of the previous objects wherein the blades sweep a path that is radially inward of the paths swept by the first and second pairs of blades.

These and other objects of the invention will become apparent from reading the following description together with the appended drawings.

BRIEF DESCRIPTION OF THE DRAWINGS

FIG. 1 is a right side elevational view of a rotary cutter embodying a shredding attachment in accordance with the present invention.

FIG. 2 is a top view showing an enlargement of the cutting and shredding blade arrangement of the rotary cutter shown in FIG. 1.

FIG. 3 is an elevational view of the structure shown in FIG. 2.

DESCRIPTION OF THE PREFERRED EMBODIMENT

Figure 4:
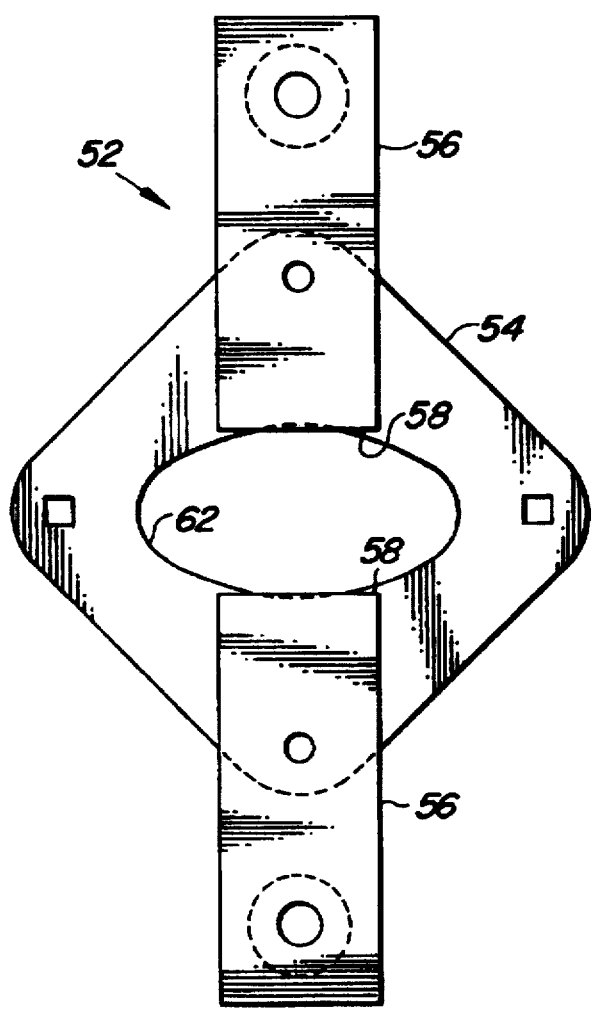
FIG. 4 is an enlarged top view of the shredding blade holder shown in FIG. 2.

Referring now to FIG. 1, there is shown a rotary cutter 10 of a towable type including a blade housing 12, a hitch 14 pivotally attached to the forward end of the housing and a pair of ground wheels 16 mounted to wheel arms 18 mounted at transversely spaced locations along an axle 20 coupled to the rear end of the housing 12 for pivoting about a horizontal axis in response to actuation of a hydraulic cylinder 22 coupled between the housing and the axle. Located centrally on the top of the housing 12 is a right angle gear box 24 containing an input shaft coupled to a rear end of a telescopic drive shaft 26 having a forward end adapted for connection to a tractor p.t.o. shaft. Projecting vertically from the gear box 24 into the blade housing 12 is an output shaft 28. Mounted to the bottom of the output shaft 28, in a manner described below, is a blade assembly 30.

Figure 5:
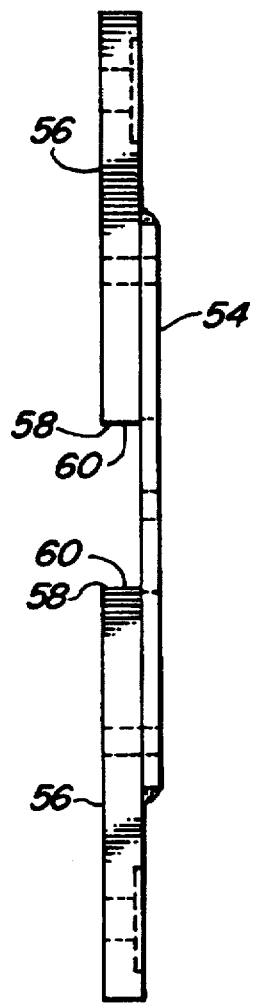
FIG. 5 is an elevational view of the structure shown in FIG. 4.

Referring now also to FIGS. 2–5, it can be seen that the blade assembly 30 comprises a first blade holder 32 in the form of a straight bar of rectangular cross section having a mounting hub 34 welded to a location midway between opposite ends of the bar. Mounted on the opposite side of the bar from the hub 34 is a diamond-shaped reinforcement plate (not visible). The hub 34 is splined (not shown), as is well known, and fits onto splines provided on a lower end section of the output shaft 28 where it is held in place by a mounting bolt (not shown) projecting through a hole 36 provided in the blade holder bar and reinforcement plate in axial alignment with the hub 34 and being received in a threaded hole extending axially into the shaft 28. Pivotally mounted to opposite ends of the first blade holder 32, as by pivot bolts 38, are, upper or first and lower or second pairs of cutting blades 40 and 42, respectively. The upper pair of cutting blades 40 each include an inner mounting section 44 located on a top surface of the blade holder 32 and include an outer cutting section 46 located substantially coplanar with the top surface of the blade holder 32. The lower pair of cutting blades 42 each include an inner mounting section 48 located on a bottom surface of the blade holder 32 and have an outer cutting section 50 offset downwardly from the mounting section 48 so that it is spaced below and in vertical alignment with the associated upper cutting blade 40. The structure of the blade assembly 30 described up to this point is conventional.

The blade assembly 30 further includes a second blade holder 52 comprising a square flat plate 54 having a pair of identical, bar sections 56, of rectangular cross section, welded to an upper surface of the plate in alignment with a line extending between a diagonal of the plate 54. Inner ends 58 of the bar sections 56 are spaced from each other by a distance substantially equal to the width of the first blade holder 32 so as to define a slot 60 (FIG. 5) in which a central portion of the holder 32 is received when the assembly 30 is assembled as disclosed. Further, located centrally in the plate 54 and having its long axis oriented perpendicular to the axis of the bar sections 56 is an oval opening 62 which provides clearance for the diamond shaped reinforcement plate located on the bottom of the first blade holder 32. Thus, it will be appreciated that the second blade holder 52 is disposed at a 90° angle, or perpendicular, to the first blade holder 32. Provided for securing the first and second blade holders 32 and 52 together are a pair of identical straps 64 located on the opposite sides of the bar sections 56 from the plate 54 and having first ends bolted, as by square shouldered bolts located at 66, to a first set of diagonally opposite corners of the plate 54 and to the first blade holder 32; and having second ends bolted, as at 68, to a second set of diagonally opposite corners of the plate 54 and to the bar sections 56 of the second blade holder 52. Thus, it will be appreciated that the second blade holder 52 can be removed or installed without disturbing the mounting for the first blade holder 32. An intermediate or third pair of blades 70, that are identical to the upper pair of blades 40, have inner mounting sections 72 located beneath and respectively pivotally connected, as by pivot bolts 74, to the outer ends of the bar sections 56. The location and length of the bar sections 56 is such that outer cutting sections 76 of the blades 70 sweep a path which is radially inwardly of, and at a height approximately half way between, the paths swept by the cutting sections 46 and 50 respectively of the upper and lower pairs of cutting blades 40 and 42.

I claim:

1. In a rotary cutter including a blade housing, a vertical drive shaft projecting into said housing, a first blade holder releasably fixed to said drive shaft by a mounting bolt received in a hole provided in said first blade holder, said first blade holder having a first pair of connection points respectively at radially opposite locations equidistant from said drive shaft, upper and lower pairs of cutter blades being respectively pivotally mounted to said first blade holder at said first pair of connection points, with the upper cutter blades tracing a first circular path about said drive shaft which is above a second circular path traced by said lower cutter blades, the improvement comprising: a second blade holder; connection means, exclusive of said mounting bolt, releasably securing said second blade holder directly to said first blade holder, whereby said second blade holder is mounted for rotating together with said first blade holder; said second blade holder containing a second pair of connection points respectively at radially opposite locations equidistant from said drive shaft and along a first straight line offset 90° from and being coplanar with a second straight line extending through said first pair of connection points; and a pair of intermediate cutter blades being respectively pivotally mounted to said second blade holder at said second pair of connection points such as to trace a third circular path about said drive shaft which is at a height between respective heights of said first and second circular paths.

2. The rotary cutter defined in claim 1 wherein said upper and intermediate cutter blades are identical.

3. The rotary cutter defined in claim 1 wherein said pair of intermediate cutter blades are spaced from each other a distance less than that between said upper pair of blades and between said lower pair of blades whereby said third circular path is spaced radially inwardly toward said drive shaft from said first and second circular paths.

4. The rotary cutter defined in claim 1 wherein said first blade holder includes a horizontal bar extending beneath said drive shaft and containing said hole receiving said mounting bolt and having parallel upper and lower planar surfaces; said second blade holder including a horizontal plate located centrally between said second pair of connection points and being engaged with said lower planar surface of said bar of said first blade holder; and said plate containing a mounting bolt access opening aligned with said drive shaft.

5. The rotary cutter defined in claim 1 wherein said first blade holder is defined by a straight bar of rectangular cross section having parallel upper and lower planar surfaces extending between opposite ends thereof; said second blade holder including a centrally located horizontal plate having an upper surface to which is fixed a pair of oppositely projecting bar sections respectively containing said second pair of connection points adjacent respective first ends thereof and including respective second ends spaced apart from each other to define a gap having width approximately equal to the width of said bar of said first blade holder; and said first blade holder being located in said gap whereby said bar of said first blade holder and said bar sections of said second blade holder are coplanar.

6. The rotary cutter defined in claim 5 wherein said plate is a parallelogram and said pair of bar sections are fixed to the upper surface of said plate along a first diagonal line extending through a first pair of opposite corners of said plate; and said lower surface of said bar of said first blade holder being engaged with said upper surface of said plate along a second diagonal line extending through a second pair of opposite corners of said plate.

7. The rotary cutter defined in claim 5 wherein said connection means includes clamp member means engaged with said upper surface of the first blade holder bar and with respective upper surface locations of said bar sections at areas vertically above said plate and fasteners extending through said plate, first blade holder bar and second blade holder bar sections, and through said clamp member means, whereby said second blade holder plate is clamped tightly against said first blade holder bar, and said second blade holder bar sections are coupled to said first blade holder bar.

8. The rotary cutter defined in claim 7 wherein said plate is a parallelogram and has a first pair of diagonally opposite corners respectively located in vertical alignment with said first blade holder and has a second pair of diagonally opposite corners respectively located in vertical alignment with said bar sections of said second blade holder; and said clamp member means of said connection means comprising a first strap having opposite ends located in vertical alignment with one each of said first and second pairs of diagonally opposite corners of said plate, and a second strap having opposite ends located in vertical alignment with another of each of said first and second pairs of diagonally opposite corners of said plate; and said fasteners including four fasteners with each extending through a respective one of the opposite ends of said first and second straps and a respective one of the corners of said plate.

* * * * *